US006192134B1

(12) United States Patent
White et al.

(10) Patent No.: US 6,192,134 B1
(45) Date of Patent: Feb. 20, 2001

(54) SYSTEM AND METHOD FOR A MONOLITHIC DIRECTIONAL MICROPHONE ARRAY

(75) Inventors: Stanley A. White, San Clemente; Kenneth S. Walley, Portola Hills; James W. Johnston, Rancho Santa Margarita; P. Michael Henderson, Tustin; Kelly H. Hale, Aliso Viejo, all of CA (US); Warner B. Andrews, Jr., Boulder, CO (US); Jonathan I. Siann, San Diego, CA (US)

(73) Assignee: Conexant Systems, Inc., Newport Beach, CA (US)

( * ) Notice: Under 35 U.S.C. 154(b), the term of this patent shall be extended for 0 days.

(21) Appl. No.: 08/974,874

(22) Filed: Nov. 20, 1997

(51) Int. Cl.[7] .................................. H04R 3/00; G01S 3/80

(52) U.S. Cl. ............................ 381/92; 381/122; 367/119; 367/121; 367/129

(58) Field of Search ............................. 381/92, 122, 111; 367/129, 119, 118, 124, 121

(56) References Cited

U.S. PATENT DOCUMENTS

| | | | |
|---|---|---|---|
| 4,003,016 | 1/1977 | Remley . | |
| 5,253,221 | * 10/1993 | Coulbourn | 367/135 |
| 5,357,484 | * 10/1994 | Bates et al. | 367/118 |
| 5,610,991 | 3/1997 | Janse . | |
| 5,619,476 | * 4/1997 | Haller et al. | 367/181 |
| 5,663,930 | * 9/1997 | Capell, Sr. et al. | 367/119 |
| 5,668,777 | * 9/1997 | Schneider | 367/96 |
| 5,699,437 | * 12/1997 | Finn | 381/71 |
| 5,703,835 | * 12/1997 | Sharkey et al. | 367/124 |
| 5,864,515 | * 1/1999 | Stinchcombe | 367/103 |
| 5,983,119 | * 11/1999 | Martin et al. | 455/575 |

FOREIGN PATENT DOCUMENTS

WO 97/08896 3/1997 (WO) .

OTHER PUBLICATIONS

Cao, Y., et al.; "Speech Enhancement Using Microphone Array with Multi–Stage Processing"; IEICE Transactions on Fundamentals of Electronics, Communications and Computer Sciences; Mar. 1, 1996; vol. E79–A; No. 3; pp. 386–394, 392.

Affes, S., et al.; "Robust Adaptive Beamforming Via LMS–Like Target Tracking"; Proceedings on the International Conference on Acoustics, Speech and Signal Processing (ICASSP), S. Statistical Signal and Array Processing Adelaid; Apr. 19, 1994; vol. 4; No. CONF. 19; pp. 269–272.

* cited by examiner

*Primary Examiner*—Forester W. Isen
*Assistant Examiner*—Brian Tyrone Pendleton
(74) *Attorney, Agent, or Firm*—Snell & Wilmer, LLP

(57) ABSTRACT

A system and method for a directional microphone system is disclosed. The directional microphone system can adaptively track and detect sources of sound information, and can reduce background noise. A first monolithic detection unit for detecting sound information and performing local signal processing on the detected sound information is provided. In the detection unit, an integrated transducer is provided for receiving acoustic waves and for generating sound information representative of the waves. A processor is coupled to the transducer for receiving the sound information and for performing local digital signal processing on the sound information to generate locally processed sound information. A base unit is coupled to the first monolithic detection unit and includes a global processor which receives the locally processed sound information and performs global digital signal processing on the locally processed sound information to generate globally processed sound information.

30 Claims, 5 Drawing Sheets

SYSTEM AND METHOD FOR A MONOLITHIC DIRECTIONAL MICROPHONE ARRAY

BACKGROUND OF THE INVENTION

1. Field of the Invention

This invention relates generally to the field of microphones, and in particular, to a system and method for a monolithic directional microphone array.

2. Background Art

There are two general types of prior art microphones. The first type is the stand-alone microphone. Stand-alone microphones suffer from a number of disadvantages. First, these microphones cannot differentiate between two or more acoustic signals having different frequencies or originating from different spatial locations. Second, these microphones are unable to adapt to changing sources of sound, and are unable to track a moving source of sound.

The second type of prior art microphones is actually a microphone system which includes signal processing capabilities that can track and adapt to changing sources of sound. Unfortunately, these microphone systems are expensive, bulky and not suited for home use.

Noise cancelling microphones represent one type of prior art system that can track and adapt to changing sources of sound, and are commonly employed, for example, in helicopters. Such a noise cancelling microphone includes one microphone to record the speaker's voice, a second microphone to record the background noise, and a noise reduction circuit that subtracts the background noise from the speaker's voice to improve the signal quality of the speaker's voice. Although the noise cancelling microphone is suitable for noisy environments, these microphones suffer from several disadvantages. First, noise cancelling microphones cannot track a moving sound source, nor can they selectively adapt to a particular spatial angle. Second, they are costly.

Another example of prior art systems that can track and adapt to changing sources of sound are those employed by the military. Military directional acoustic detection systems are adept at tracking a changing sound source. These systems employ digital signal processing (DSP) techniques such as adaptive beam forming and noise reduction (commonly referred to as null steering) to improve signal quality. These systems, such as sonar systems, are commonly employed in submarines and ships. However, these prior art directional systems suffer from the drawbacks that they operate in a water medium and are bulky in nature. For example, the transducers employed in a towed array or mounted on the hull of a ship are large, heavy and unwieldy to maneuver. Moreover, the signal processing units are complex and often occupy several rooms of space.

Yet another example of prior art systems that can track and adapt to changing sources of sound are the ADAP 256 and ADAP 1024 systems that were sold by the assignee of the present application. These systems were used by law enforcement agencies, and are capable of performing functions such as frequency discrimination, separating the speakers' voices (i.e., sounds) based on correlation times, and removing background sounds. However, these systems are bulky (about 19 inches wide by 24 inches deep by 5 inches high) and expensive.

Accordingly, the size, complexity, and cost of the transducers and signal processing units required by the prior art systems that are capable of tracking and adapting to changing sources of sound hinder the use of these systems in consumer household electronics.

Accordingly, there remains a need for a system and method for a monolithic directional microphone array that can track and/or locate a changing source of acoustic waves or noise, that can separate components of a sound field, selectively enhance each component and selectively recombine them, and that is compact, portable, and cost effective.

SUMMARY OF THE INVENTION

According to one aspect of the invention, a system and method for a monolithic directional microphone array is provided. The present invention can track and/or locate a moving and changing source of acoustic signals or noise.

According to another aspect of the invention, a directional microphone that adapts to a sound signal based upon spatial and/or frequency requirements is provided.

According to another aspect of the invention, a directional microphone that minimizes noise is provided. The directional microphone of the present invention can selectively block signals having certain frequencies and/or signals radiating from a certain spatial direction.

According to another aspect of the invention, unlike the prior art adaptive processing systems that have many bulky hardware components (e.g., transducers and processors), the present invention provides a directional adaptive microphone that is embodied in two or more monolithic chips. At least one monolithic detection unit includes at least one integrated transducer for detecting the sound signals, and a processor for executing local digital signal processing (DSP) programs to generate a signal representing the sound information of the sound signals. A monolithic base unit includes a processor for executing global digital signal processing (DSP) programs based on the sound information received from the detection unit(s) to generate globally processed sound information.

According to another aspect of the invention, a directional microphone is provided with a monolithic detection unit that integrates a transducer with signal processing elements so that adaptive processing, directional steering, and frequency steering can all be performed on the chip.

According to another aspect of the invention, a directional microphone that can separate components of a sound field, selectively enhance each component, and selectively recombine them is provided.

According to another aspect of the invention, a directional microphone that is light, compact, and useful in consumer household applications is provided.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known, devices and circuits are omitted so as to not obscure the description of the present invention with unnecessary detail.

Figure 1:
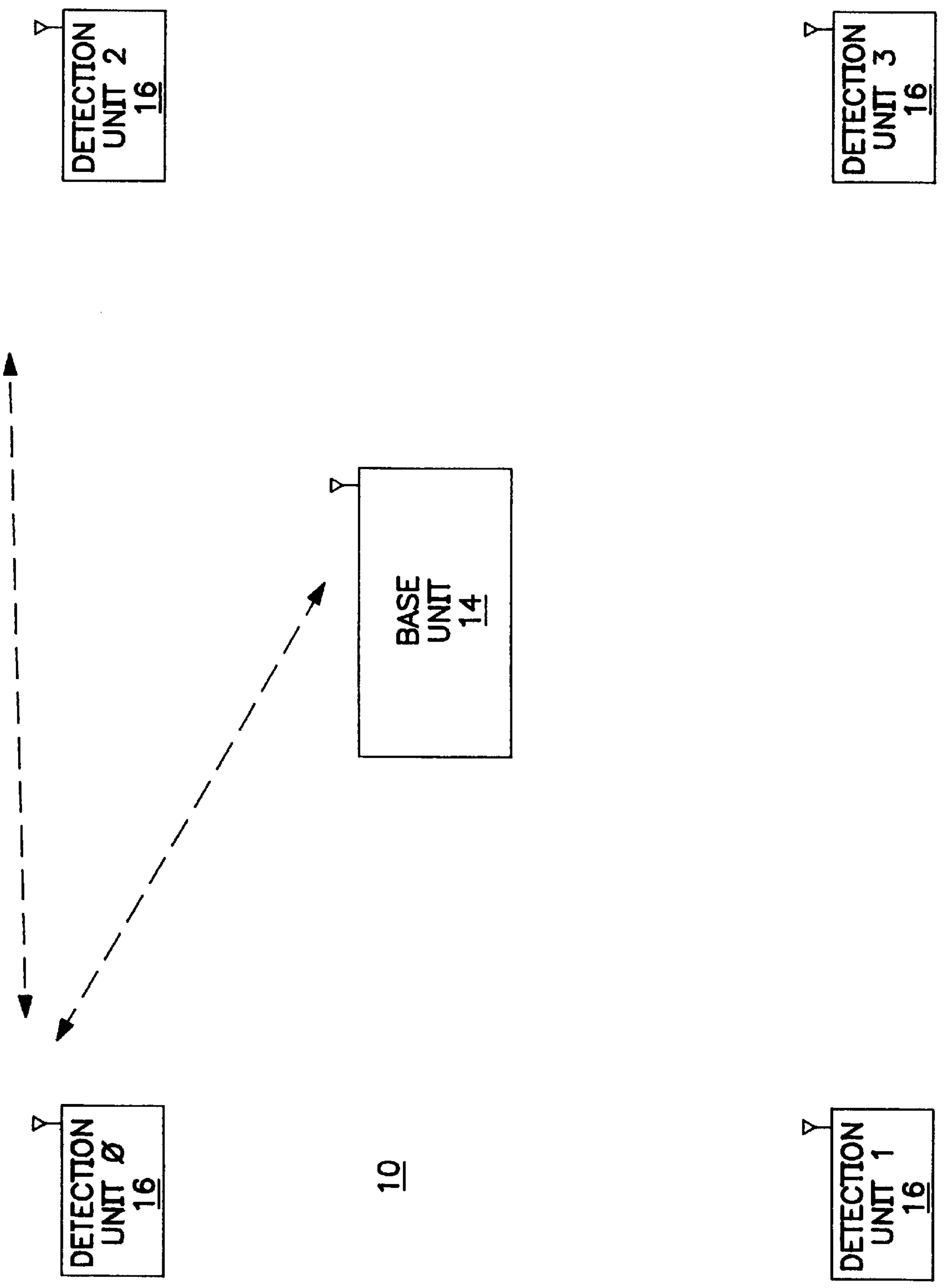
FIG. 1 is a simplified block diagram illustrating one embodiment of the directional microphone system of the present invention.

FIG. 1 is a simplified block diagram of the directional microphone system 10 configured in accordance to one embodiment of the present invention. The directional microphone system 10 includes a base unit 14 and one or more detection units 16 (e.g., detection unit0 . . . detection unit3). The base unit 14 and each detection unit 16 are configured to communicate information to each other. For example, a detection unit 16 (e.g., detection unit0) can communicate information to the base unit 14 or to another detection unit 16 (e.g., detection unit2). Two units, which can include the base unit 14, can communicate with each other by employing conventional computer network and information transfer protocols.

In one embodiment, a first detection unit detects and locally processes the detected sound information. The first detection unit then communicates the detected and locally processed information to a second detection unit. The second detection unit detects and locally processes sound detected by the second detection unit. The second detection unit appends the information received from the first detection unit to the locally processed information and then communicates the received information and its own detected and locally processed information to a third detection unit. This can be repeated until the collective information (detected and locally processed) is communicated to the final detection unit. Thereafter, the information is communicated to the base unit 14. The base unit 14 sends instructions or control signals to each of the detection units 16 to direct the local processing of the local information. For example, the base unit 14 can instruct a detection unit 16 to combine the signals of several detection units 16 into a steered array. Combining the signals into a steered array can involve delaying and scaling each sensor data by a different value. Consequently, the directional microphone system 10 of the present invention is more flexible and adapts more quickly than prior art microphones to changes in the signal characteristics of the sound to be detected, as well as, to changes in the background noise.

Alternatively, it is also possible to provide the directional microphone system 10 of the present invention such that each detection unit 16 only processes the sound detected by it, with each detection unit 16 communicating its locally processed information to the base unit 14 which is responsible for processing all the information received from all the detection units 16.

In addition, although FIG. 1 illustrates the provision of four detection units 16, it is possible to implement the directional microphone system 10 of the present invention by using only one detection unit 16. In fact, any number of detection units 16 can be provided without departing from the spirit and scope of the present invention.

The base unit 14 and the detection units 16 can be coupled with wires or cables or can be connected by a wireless link. For example, in a wireless system, each unit can employ a transceiver to communicate with another unit. In a non-limiting preferred silicon embodiment, the transceiver is a Gallium Arsenide (GaAs) emitter (e.g., a laser) and silicon detector. Gallium Arsenide (GaAs) emitters and silicon detectors are known in the art for providing inter-chip communication especially suited for high bandwidth applications.

In an alternative embodiment, transducers can also be located in the base unit 14, so that the base unit 14 can also act as a detection unit. In other words, it is also possible to co-locate a detection unit 16 with the base unit 14.

Figure 2:
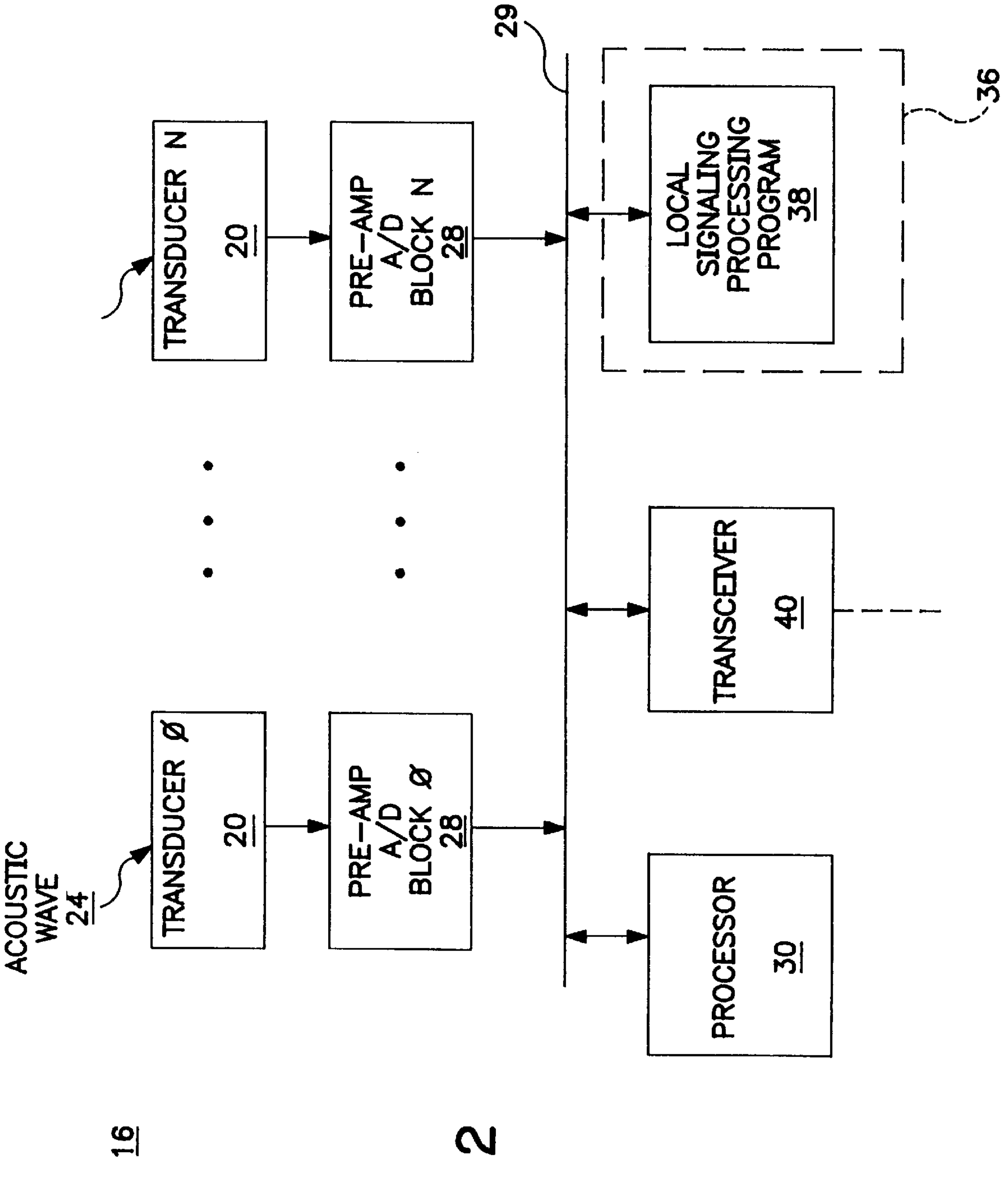
FIG. 2 is a simplified block diagram illustrating a monolithic unit of FIG. 1 having integrated transducers configured in accordance with one embodiment of the directional microphone system of the present invention.

FIG. 2 is a simplified block diagram illustrating a monolithic detection unit 16 configured in accordance with one embodiment of the directional microphone system 10 of the present invention. The monolithic detection unit 16 includes at least one integrated transducer 20 for converting acoustic waves into electrical signals representative of the acoustic waves. Each transducer 20 includes a separate output for providing an output signal that is made available for further processing. As explained hereinbelow, known methods for phased array processing, a form of digital signal processing (DSP), are then employed to process these representative signals to obtain focused directional gain.

The acoustic transducers 20 are aligned in a regular and predetermined (known) pattern to form a fixed array. For example, in one embodiment, there is a single detection unit 16 with a linear array of ten transducers 20. In a non-limiting preferred embodiment, each of the transducers 20 operates in a frequency range of 50 Hz to 20 kHz and has an approximate dimension of up to 50 mm. The transducers 20 are manufactured by known silicon processing methods such as a micro-machining technology. This technology can be tailored to manufacture an integrated array of acoustic silicon transducers 20. An advantage of the monolithic directional microphone system 10 of the present invention is that it is possible for a number of transducers 20 to fail and yet have an operational and functional directional microphone.

Each transducer 20 is coupled to a pre-amplifier and analog to digital (A/D) conversion circuit 28 that amplifies the output of the transducer 20 and converts the amplified analog signal into a digital value that can be manipulated by conventional digital signal processing (DSP) techniques.

A processor 30 is provided for executing programs. In the preferred embodiment, the processor 30 is a specialized digital signal processor with a specialized set of instructions and functions. A memory 36 includes a local signal processing program 38, as well as other instructions and data. The processor 30 can employ a real time operation system (RTOS) to manage the local signal processing program 38. The memory 36 can be implemented in a random access memory (RAM). The processor 30, memory 36 and the pre-amplifier and analog to digital (A/D) conversion circuit 28 are coupled to and communicate through a bus 29. A sampling clock (not shown) having a frequency of approximately 44.1 kHz may be employed in one embodiment. A transceiver 40 is also coupled to the bus 29 to communicate information from the detection unit 16 to another detection unit or the base unit 14.

Under the direction of the local signal processing program 38, the processor 30 receives the detected signals and user inputs (such as temporal frequency or spatial information), and responsive thereto, generates a spatially directed virtual array (also known as a phased array) whose output is also processed in the frequency and/or time domain. Thus, the virtual array can be "directed" to focus on signals in a certain frequency (bandwidth) and/or on signals emanating from a specific spatial location.

In other words, the detection units 16 of the microphone system 10 of the present invention can be steered to different bandwidths and spatial directions, and made to enhance or suppress predetermined frequency and/or time domain characteristics, by simply changing the phased array DSP parameters rather than moving the physical location of the transducers in the fixed array. Those skilled in the art will appreciate that the well-known digital signal processing functions, such as filtering, modulation/demodulation, convolution, autocorrelation, cross correlation, sample-rate changing, nonlinear function generation, and FFT/DFT/other transformations, can be applied by the microphone system 10 of the present invention to provide the desired output. Examples of such digital signal processing techniques will be described in greater detail hereinbelow.

It will be understood by those skilled in the art that instead of a single processor 30, as shown in FIG. 2, the present invention can employ a dedicated processor for each transducer 20 so that the digital signal processing (DSP) may be performed in parallel.

Figure 3:
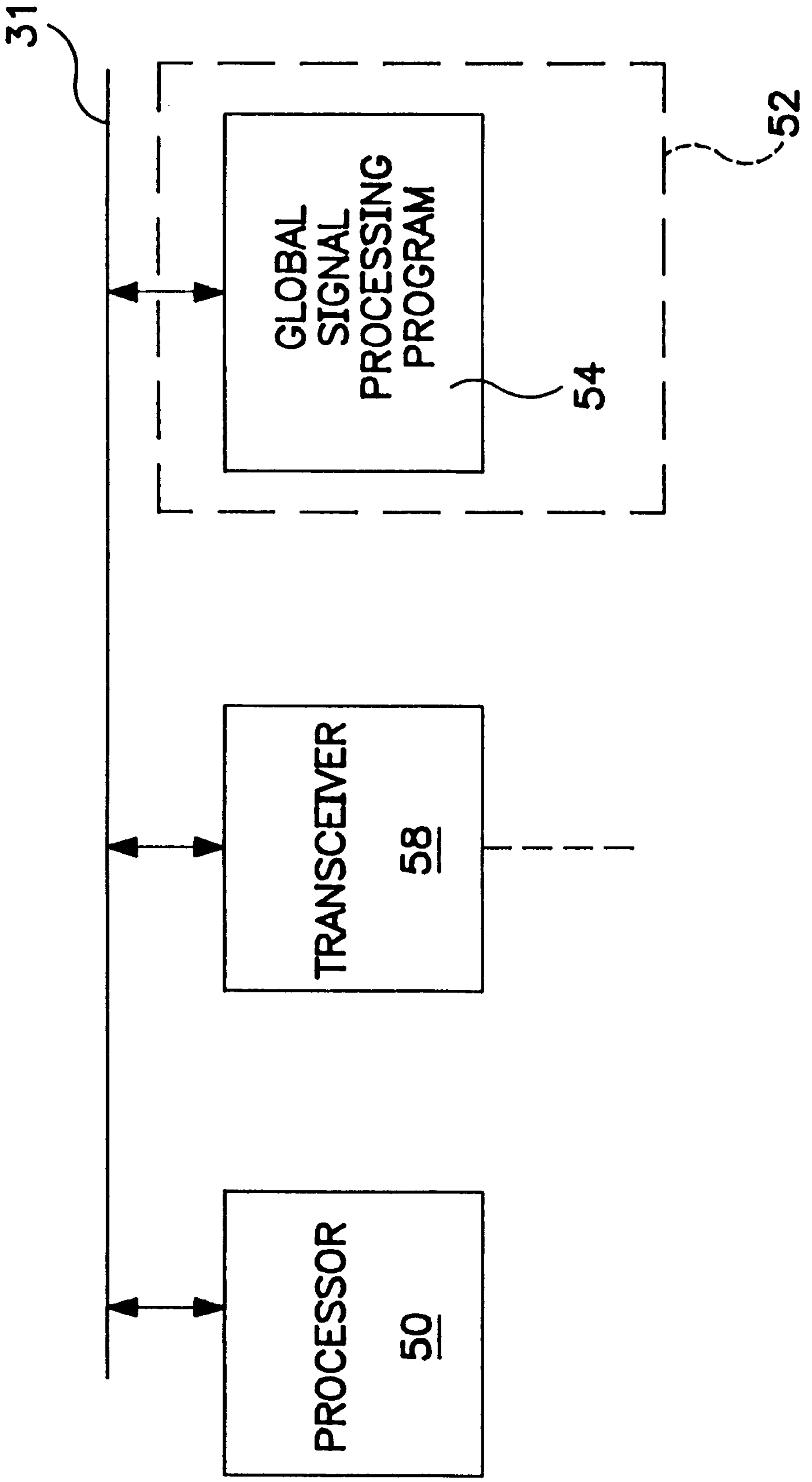
FIG. 3 is a simplified block diagram illustrating a monolithic base unit of FIG. 1 configured in accordance with one embodiment of the directional microphone system of the present invention.

FIG. 3 is a simplified block diagram illustrating the monolithic base unit 14 configured in accordance with one embodiment of the directional microphone system of the present invention. A processor 50 is provided for executing programs. A memory 52, such as a PROM, includes a global signal processing program 54, as well as other instructions and data. The processor 50, memory 52 and a transceiver 58 are coupled to and communicate through a bus 31. The transceiver 58 is also coupled to the bus 31 to communicate information from the base unit 14 to another detection unit 16. If the base unit 14 is co-located with a detection unit 16, then the same bus 29 can be used.

Under the direction of the global signal processing program 54, the processor 50 receives the detected and pre-processed local signals from the detection units 16 and user inputs (such as frequency or spatial information), and responsive thereto, generates a global virtual array (also known as a phased array). Thus, the global virtual array can be "directed" to focus on signals in a certain frequency (bandwidth) and/or on signals emanating from a specific spatial location. In other words, the microphone system 10 of the present invention can be steered to different bandwidths and spatial directions by simply changing the phased array DSP parameters rather than moving the physical location of the transducers in the fixed array(s). Consequently, a signal within a specified bandwidth and/or within a given spatial location can be detected. Moreover, the virtual or phased array can be adapted to focus on a signal with a specified frequency content and/or originating from a specified spatial location.

After processing all the signal inputs, the base unit 14 generates the desired voice or other sound to be detected. The sound can then be amplified for recording onto a medium (e.g., tape) or presented through a playback device, such as headphones or a speaker.

Figure 4:
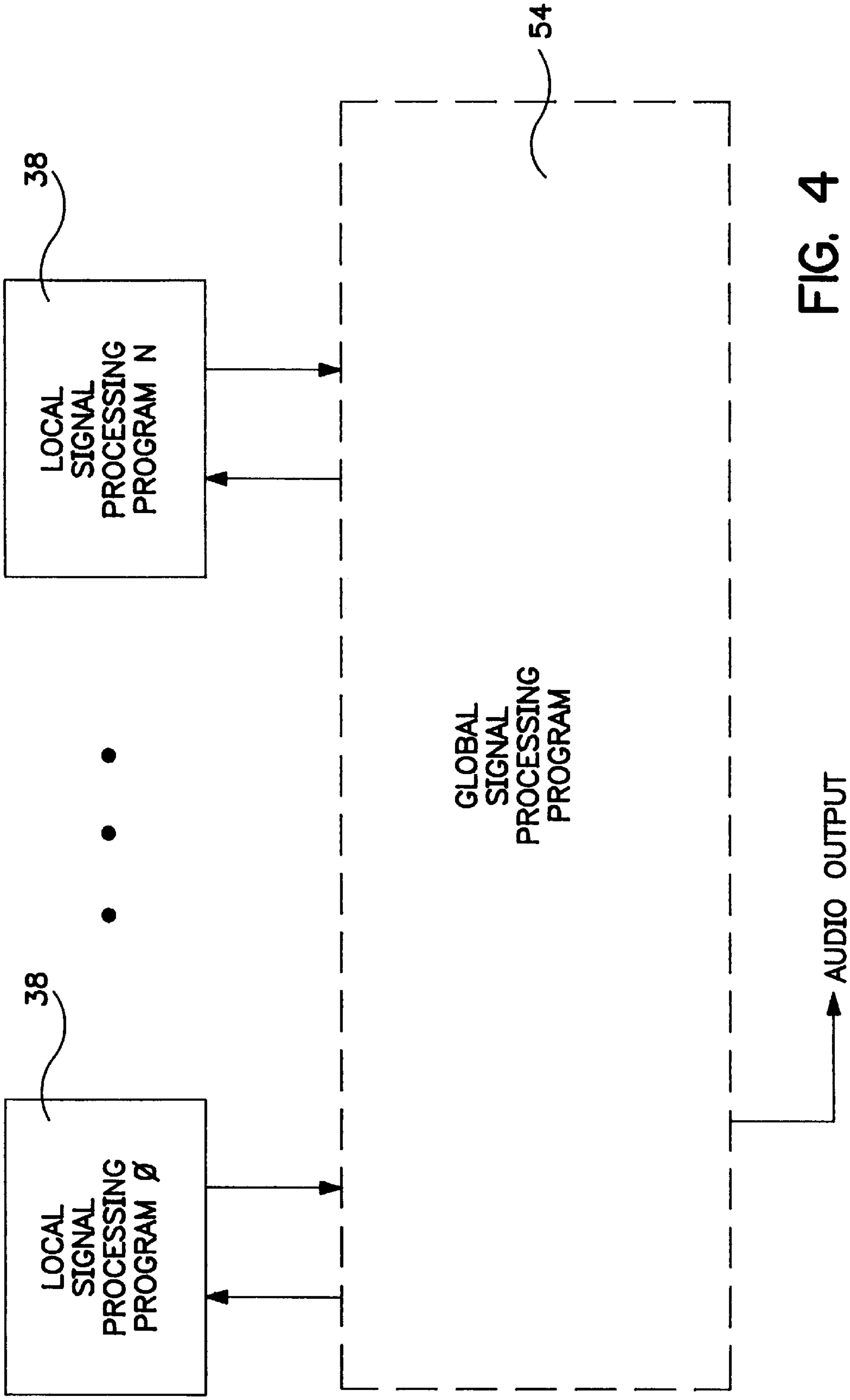
FIG. 4 is a simplified block diagram illustrating the interaction between the local signal processing program of FIG. 2 and the global signal processing program of FIG. 3.

FIG. 4 is a simplified block diagram illustrating the interaction between the local signal processing program 38 of FIG. 2 and the global signal processing program 54 of FIG. 3. Signals from each transducer 20 output may be delayed, weighted, and summed multiple times, in order to produce multiple steered virtual arrays. The number of virtual arrays that can be formed simultaneously is limited only by the amount of hardware. For example, the number of programmable gains is equal to the number of transducers multiplied by the number of arrays plus memory needed to implement the delays. The gains can be multiplexed at the cost of additional data storage. This steering of the virtual array includes null-steering, noise cancellation and source tracking.

Signals from each array output can then be processed by variable-coefficient filters to provide frequency-domain filtering, equalization (removal of frequency distortion), predictive deconvolution (echo removal), and adaptive noise cancellation. Each such filter may be composed of finite-impulse response (FIR) filters, infinite-impulse response (IIR) filters, or a combination of the above. In essence, the array output signals are further delayed, weighted, and summed. Filter-coefficient computations can include gradient determinations and pattern recognition using neural-network and fuzzy-logic concepts. Some of these computations can be done at the detection units 16, but the heavy computational loads may be centralized at the base unit 14.

Depending on one's signal-processing goals, adaptive filtering and processing can be tailored to further these goals. What distinguishes one type of processing from another is the "intelligence" that determines the amount of delay and weighting on each signal path.

Efficient hybrid processing techniques can be employed that combine the calculations for the spatial and frequency filtering. This approach significantly reduces the number of operations to be performed on the transducer 20 outputs at the cost of moderately increasing the complexity of the calculations of the filter coefficients.

The processing of the output of each transducer 20 is performed at the detection unit 16. The detection unit 16 can perform some of the coefficient calculations autonomously or under the control of the base unit 14. The detection unit 16 outputs are communicated to the base unit 14 which, in turn, issues computational commands or data to the detection units 16. The provision of both the local signal processing program 38 and the global signal processing program 54, and of the two processors 30 and 50, provides increased flexibility to the processing of the microphone system 10 of the present invention. Since the microphone system 10 of the present invention includes multiple processors, it is able to allocate computing resources to selected higher priority tasks while still processing selected lower priority tasks in the background.

In accordance with one embodiment of the directional microphone system 10 of the present invention, the local signal processing program 38 includes the following inputs provided by the fixed transducer array and inputs provided by the user: frequency response, spatial response (beam pattern), correlation time constants, convergence coefficients, and modes of operation. The local signal processing programmed responsive to these inputs, generates the following outputs: partially processed signals, filter coefficients, and gain and delay values to be used by other detection and base units. The global signal processing program 54 includes the following inputs provided by the local signal processing program 38 and inputs provided by the user: frequency response, spatial response (beam pattern), correlation time constants, convergence coefficients, and modes of operation. The global signal processing program 54, responsive to these inputs, generates the following outputs: partially processed signals, filter coefficients, and gain and delay values to be used by other detection units 16.

Figure 5:
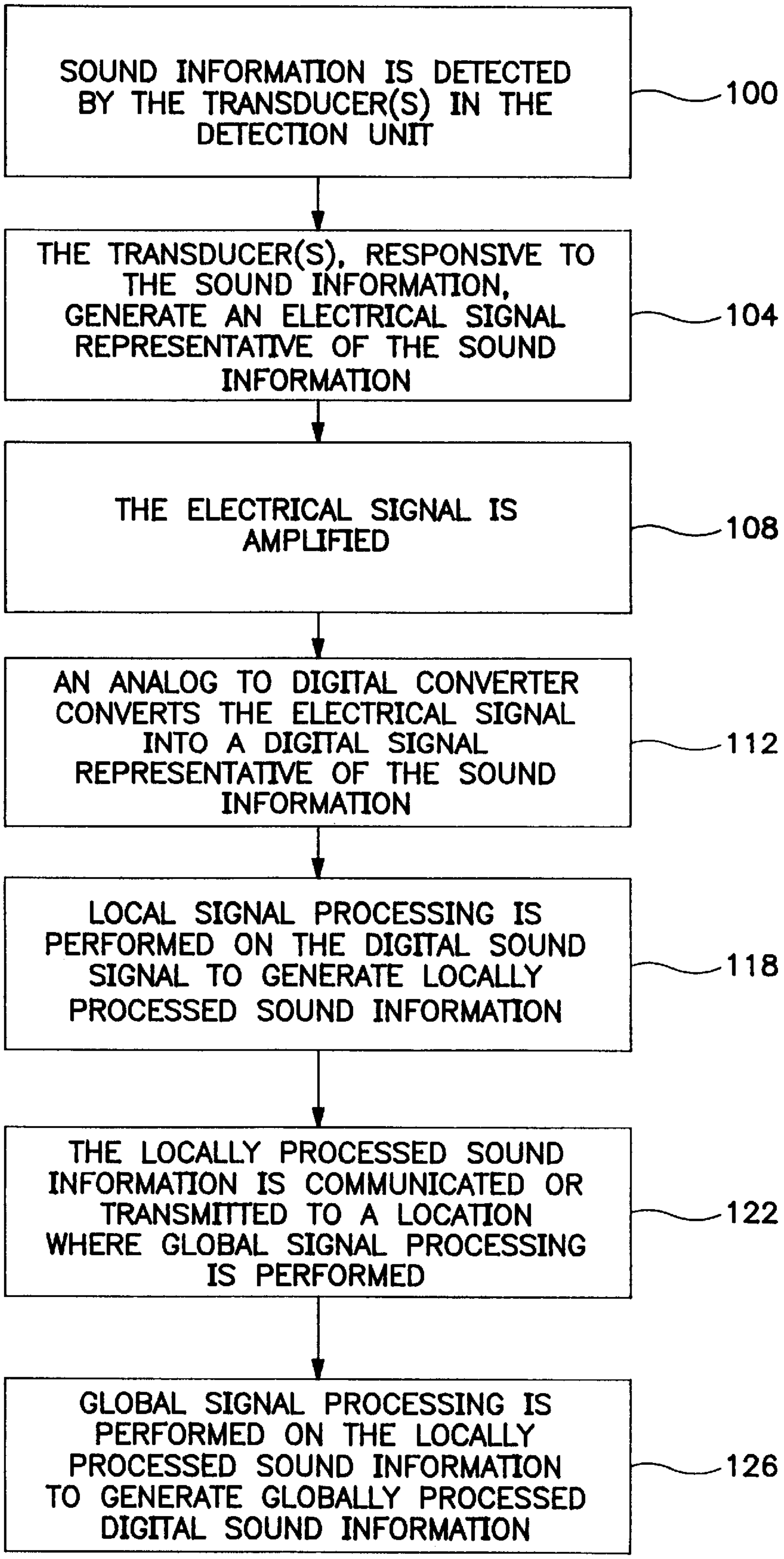
FIG. 5 is a flowchart that illustrates the processing steps carried out by the directional microphone system of the present invention.

FIG. 5 is a flowchart that illustrates the processing steps carried out by the directional microphone system of the present invention for an exemplary audio source. In step 100, sound information is detected by the transducer(s) 20 at a detection unit 16. In step 104, the transducer(s) 20, responsive to the sound information, generate an electrical signal representative of the sound information. In step 108, the electrical signal is amplified. In step 112, an analog to digital converter converts the electrical signal into a digital signal representative of the sound information. In step 118, a local signal processing is performed on the digital sound signal to generate locally processed sound information. In step 122, the locally processed sound information is communicated or otherwise transmitted to a location, such as a base unit 14, where global signal processing is performed. In step 126, global signal processing is performed on the locally processed sound information to generate globally processed digital sound information.

The present invention is particularly suited to provide good spatial and/or frequency resolution between two or more competing signals from two or more sources. Also, because of its directionality, the present invention is suited to operate in high noise environments. For example, in noisy environments, the present invention employs null steering processing techniques to reduce or eliminate the noise. Furthermore, the directional microphone system 10 of the present invention can be employed to track or locate a speaker or a noise source using methods known to those skilled in the art. For example, frequency dependent patterns and correlation times for the speaker are established, and these features are then spatially tracked by taking the partial derivatives in space of these features with respect to angular displacement. This information can be used to direct beam steering using an LMS error criteria.

Local signal processing and global signal processing can include, for example, but is not limited to, adaptive processing (including adaptive beam forming), frequency steering, directional steering, and null steering for noise removal. These DSP techniques automatically adapt to changes in the angle of the interfering noise.

Adaptive beam forming is well known in the art and is simply digital signal processing that places a null in a beam pattern to cancel out noise that exists in a certain direction. Adaptive beam forming is also commonly referred to as null steering because the processing involves placing a null in a beam pattern to cancel out noise. The noise cancellation is performed by digital signal processing techniques that dynamically track changes in the spatial position of the interference or noise. For a general treatment of acoustic beam forming principles, please see, R. J. Urick, *Principles of Underwater Sound*, McGraw-Hill Book Company (1967).

For example, adaptive time-domain processing on the output of each array (and in rare occasions, on the output of each transducer 20) generally falls into one of four broad categories of linear processing methods. In a first category, a signal component with a given correlation time is attenuated by a finite-impulse-response (FIR) filter with time-varying coefficients whose values are computed by cross-correlators mechanized according to the steep-descent LMS (least-mean square) error algorithm.

In a second category, a signal component that is linearly related to a separately supplied reference signal is selectively attenuated or enhanced, again by an FIR filter using the LMS algorithm. The supplied reference signal may be generated by another steered array on the same or on another detection unit 16. The processing methods of the first two categories differ only in the way the error is computed.

In a third category, the signal is decorrelated from itself using the FIR filter, a delay and an LMS algorithm. For example, echo cancellation is a well-known application. For each of the first three categories, adaptive FIR processing may be replaced by adaptive infinite-impulse-response (IIR) processing, which is described in U.S. Pat. No. 4,038,495 to White, the entire disclosure of which is incorporated herein by this reference as though fully set forth herein.

In a fourth category, the frequency structure of the signal is changed linearly to match certain predetermined frequency requirements, as described in U.S. Pat. No. 4,524,424 to White, the entire disclosure of which is incorporated herein by this reference as though fully set forth herein. For example, this method is used to achieve adaptive equalization in a concert hall.

In addition to the four linear methods described above, there is a non-linear processing method that can shape the amplitude-density function of the output of a steered array, as disclosed in U.S. Pat. No. 4,507,741 to White, the entire disclosure of which is incorporated herein by this reference as though fully set forth herein. There is yet another non-linear processing method that can simultaneously shape both the amplitude-density function and the output spectrum, as disclosed in U.S. Pat. No. 4,843,583 to White et al., the entire disclosure of which is incorporated herein by this reference as though fully set forth herein.

In addition to adaptive time-domain processing, there is adaptive frequency-domain processing. Adaptive frequency-domain processing is a three-step process. In the first step, the signal is transformed into the frequency domain by taking its Fourier transform by one of several methods, such as the fast-Fourier transform or FFT. In the second step, the frequency-domain weights are modified by an LMS adaptive process, such as described by M. Dentino, B. Widrow and J. McCool in “Adaptive Filtering in the Frequency Domain”, *IEEE Proceedings*, Vol. 66, No. 12, December 1978, and U.S. Pat. No. 4,207,624 to Dentino et al., the entire disclosures of which are incorporated herein by this reference as though fully set forth herein. In the third step, the modified weights are transformed back to the time domain by the inverse fast Fourier transform or IFFT to produce a modified signal. This method has also been referred to as adaptive fast convolution.

Another example of an adaptive DSP technique that can be employed by the global processor and the local processor is dicanne processing. Dicanne processing employs time delays in the signal processing to form an estimator beam in the direction of the noise or interference. The estimator beam is then subtracted from the output of the transducer array elements. For more information about dicanne processing, please see, V. C. Anderson, “DICANNE, a Realizable Adaptive Process”, *J. Acoust. Soc. Am.*, 45:398 (1969).

Another DSP technique employs multiplicative arrays and is commonly referred to as digital multibeam steering (dimus) processing. Dimus processing generates a number of different beams from a single array. In this technique, time delays are employed to form different beams. These time delays can be generated with digital delay elements that use successive processed samples of the output of the array elements. Consequently, various directional beams are formed simultaneously and the array can “look” acoustically in different directions at the same time. For more information about dimus processing, please see, V. C. Anderson, “Digital Array Phasing”, *J. Acoust. Soc. Am.*, 32:867 (1960); P. Rudnick, “Small Signal Detection in the DIMUS Array”, *J. Acoust. Soc. Am.*, 32:871 (1960).

For additional information on all of the adaptive processes mentioned above, including spatial processing (beam steering), time-domain processing, and frequency-domain processing, see B. Widrow and S. D. Stearns, *Adaptive Signal Processing*, Prentice-Hall, 1985; M. L. Honig and D. G. Messerschmitt, *Adaptive Filters: Structures, Algorithms, and Applications*, Kluwer Academic Publishers, 1986; and B. Mulgrew and C. F. N. Cowan, *Adaptive Filters and Equalizers*, Kluwer Academic Publishers, 1986.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A system for a directional microphone, said system comprising:

(a) a plurality of monolithic detection units for detecting sound information and performing local signal processing on said sound information, wherein each of said plurality of monolithic detection units includes:

(i) an integrated transducer for receiving acoustic waves, and responsive thereto, for generating a signal representing sound information of said waves;

(ii) a processor, coupled to the transducer, for receiving the sound information and performing local digital signal processing on the sound information by generating a spatially directed virtual array directed to focus on at least one of a certain frequency bandwidth or sound information emanating from a specific spatial location to generate locally processed sound information;

(b) a base unit, coupled to the plurality of monolithic detection units, for receiving a pre-processed local sound information from at least one of said plurality of monolithic detection units and forperforming global signal processing on the pre-processed local sound information, said base unit including a processor for receiving the pre-processed local sound information and performing global digital signal processing on the pre-processed local sound information by generating a global virtual array directed to focus on at least one of a certain frequency bandwidth or sound information emanating from a specific spatial location to generate globally processed sound information; and (c) a communication means for communicating between said plurality of monolithic detection units and said base unit, each of said detection units being capable of communicating with another detection unit and said base unit, said base unit being capable of transmitting instructions to each of said detection units.

2. The system of claim 1, wherein said processor of each detection unit executes a local signal processing program to generate the locally processed sound information.

3. The system of claim 2, wherein said processor of the base unit executes a global signal processing program to generate the globally processed sound information.

4. The system of claim 2, wherein each detection unit when executing the local signal processing program, receives the sound information and performs signal processing tasks to track a sound source, and to selectively remove noise from the sound information, thereby generating locally processed sound information.

5. The system of claim 3, wherein the base unit processor, when executing a global signal processing program, receives the sound information and performs signal processing tasks to track a sound source, and to selectively remove noise from the sound information, thereby generating globally processed sound information.

6. The system of claim 4, wherein the signal processing tasks include time-domain processing.

7. The system of claim 4, wherein the signal processing tasks include frequency-domain processing.

8. The system of claim 4, wherein signal processing tasks include adaptive beam forming.

9. The system of claim 4, wherein signal processing tasks include dimus signal processing.

10. The system of claim 5, wherein the signal processing tasks include time-domain processing.

11. The system of claim 5, wherein the signal processing tasks include frequency-domain processing.

12. The system of claim 5, wherein signal processing tasks include dimus signal processing.

13. The system of claim 5, wherein signal processing tasks include adaptive beam forming.

14. The system of claim 1, wherein each detection unit further includes a pre-amplifier and analog to digital converter circuit coupled to the transducer for generating an amplified, digital signal representing the sound information.

15. The system of claim 1, wherein the communication means is selected from at least one of the group consisting of an RF antenna, a GaAs emitter, and a silicon detector.

16. The system of claim 1, wherein the transducer is manufactured from silicon.

17. The system of claim 1, wherein the base unit and plurality of detection units are manufactured by employing a micro-machining process.

18. The system of claim 1, further including a second integrated transducer for receiving acoustic waves, and responsive thereto, generating a signal representing sound information of said waves, and wherein the detection unit processor is coupled to the second integrated transducer for receiving the sound information and for performing local digital signal processing on the sound information to generate locally processed sound information.

19. The system of claim 18, wherein the detection units further include a pre-amplifier and an analog to digital converter circuit coupled to the second transducer for receiving said signal, and responsive thereto, for generating an amplified, digital signal representing the sound information.

20. The system of claim 1, further including:

(a) a second integrated transducer for receiving acoustic waves and responsive thereto generating a signal representing sound information of said waves; and (b) a second processor, coupled to the transducer, for receiving the sound information and performing local digital signal processing on the sound information to generate locally processed sound information.

21. The system of claim 20, further including a pre-amplifier and an analog to digital converter circuit coupled to the second transducer for receiving said signal, and responsive thereto, for generating an amplified, digital signal representing the sound information.

22. The system of claim 1, further including a playback device, coupled to the base unit, for presenting the sound information.

23. A method of detecting audio signals generated by an audio sources, comprising the steps of:

(a) receiving sound information;

(b) responsive to the sound information, generating an electrical signal representative of the sound information;

(e) performing local signal processing at a local detection unit on the electrical signal by generating a spatially directed virtual array directed to focus on at least one of a certain frequency bandwidth or sound information emanating from a specific spatial location to generate globally processed sound information;

(f) communicating the pre-processed local sound information from said local detection unit to a base unit;

(g) performing global signal processing on the pre-processed local sound information by generating a global virtual array directed to focus on at least one of a certain frequency bandwidth or sound information emanating from a specific spatial location to generate globally processed digital sound information; and (h) communicating local processing instructions from said base unit to said local detection unit.

24. The method of claim 23, further including the steps of:

(b1) amplifying the electrical signal; and (b2) converting the electrical signal into a digital signal representative of the sound information.

25. The method of claim 23, wherein the local signal processing includes:

(a) adaptive beam steering to track a sound source, and (b) null steering to selectively remove noise from the sound information.

26. The method of claim 23, wherein the global signal processing includes:

(a) adaptive beam steering to track a sound source, and (b) null steering to selectively remove noise from the sound information.

27. The method of claim 23, wherein the local signal processing includes time-domain processing.

28. The method of claim 23, wherein the local signal processing includes frequency-domain processing.

29. The method of claim 23, wherein the global signal processing includes time-domain processing.

30. The method of claim 23, wherein the global signal processing includes frequency-domain processing.

* * * * *